US007793243B1

(12) United States Patent
Becer et al.

(10) Patent No.: US 7,793,243 B1
(45) Date of Patent: Sep. 7, 2010

(54) MULTI-ENGINE STATIC ANALYSIS

(75) Inventors: Murat R. Becer, Cedar Park, TX (US);
Joao M. Geada, Chelmsford, MA (US);
Lee La France, Bolton, MA (US);
Nicholas Rethman, North Andover, MA (US); Qian Shen, Shrewsbury, MA (US)

(73) Assignee: CLK Design Automation, Inc., Littleton, MA (US)

( * ) Notice: Subject to any disclaimer, the term of this patent is extended or adjusted under 35 U.S.C. 154(b) by 509 days.

(21) Appl. No.: 11/566,543

(22) Filed: Dec. 4, 2006

(51) Int. Cl.
*G06F 17/50* (2006.01)
*G06F 17/30* (2006.01)

(52) U.S. Cl. ............... 716/6; 716/1; 716/4; 716/5; 716/7; 707/10

(58) Field of Classification Search ............... 716/1, 716/4, 5, 6, 19; 707/10
See application file for complete search history.

(56) References Cited

U.S. PATENT DOCUMENTS

| | | | |
|---|---|---|---|
| 5,416,717 A | 5/1995 | Miyama | |
| 5,508,937 A | 4/1996 | Abato | |
| 5,600,568 A * | 2/1997 | Iwakura et al. | 716/6 |
| 5,764,533 A | 6/1998 | deDood | |
| 6,080,204 A * | 6/2000 | Mendel | 716/7 |
| 6,240,541 B1 * | 5/2001 | Yasuda et al. | 716/6 |
| 6,298,319 B1 | 10/2001 | Heile | |
| 6,367,056 B1 | 4/2002 | Lee | |
| 6,643,683 B1 * | 11/2003 | Drumm et al. | 709/203 |
| 6,742,165 B2 * | 5/2004 | Lev et al. | 716/1 |
| 6,745,376 B2 * | 6/2004 | Fredrickson | 716/6 |
| 6,785,873 B1 * | 8/2004 | Tseng | 716/4 |
| 7,006,962 B1 * | 2/2006 | Goyal et al. | 703/18 |
| 7,039,882 B2 | 5/2006 | Rana | |
| 7,043,382 B2 * | 5/2006 | Heo | 702/64 |
| 7,082,587 B2 | 7/2006 | Chen | |
| 7,117,457 B2 | 10/2006 | Frenkil | |
| 7,131,080 B2 * | 10/2006 | Chen et al. | 716/4 |
| 7,158,920 B2 * | 1/2007 | Ishikaw | 702/191 |
| 7,178,120 B2 * | 2/2007 | Hieter et al. | 716/6 |

(Continued)

OTHER PUBLICATIONS

Gai et al.; "Creator: new advanced concepts in concurrent simulation"; 1994; Computer-Aided Design of Integrated Circuits and Systems, IEEE Transactions on; vol. 13 , Issue: 6.*

(Continued)

*Primary Examiner*—Helen Rossoshek
(74) *Attorney, Agent, or Firm*—Occhiuti Rohlicek & Tsao LLP (57) ABSTRACT

A system for circuit timing analysis includes a database for holding results of execution of portions of a timing analysis computation. Multiple computation modules are configured for concurrent execution of the portions of a timing analysis computation, for example, a static circuit timing analysis computation. A control subsystem is coupled to the database and to the computation modules, and is configured to receive results of the portions of the computation from the computation modules and to update the database using the received results. Based on the received results, the control module selects further portions of the computations for computation and assign each selected portion to one of the computation modules. The system makes use of parallel processing that is arranged in a way that avoids bottlenecks, such as at least some memory access bottlenecks resulting from data structure locking.

17 Claims, 7 Drawing Sheets

U.S. PATENT DOCUMENTS

| | | | |
|---|---|---|---|
| 7,188,325 B1 | 3/2007 | Evers | |
| 7,284,216 B2 * | 10/2007 | Tsai et al. | 716/6 |
| 7,325,215 B2 * | 1/2008 | Dinter et al. | 716/11 |
| 7,389,484 B2 * | 6/2008 | Andreev et al. | 716/9 |
| 7,424,694 B2 * | 9/2008 | Ikeda | 716/6 |
| 7,454,731 B2 * | 11/2008 | Oh et al. | 716/6 |
| 2002/0032493 A1 | 3/2002 | Kadowaki et al. | |
| 2002/0038446 A1 | 3/2002 | Ioudovski | |
| 2003/0140319 A1 | 7/2003 | Bhattacharya | |
| 2003/0229410 A1 | 12/2003 | Smith | |
| 2003/0229868 A1 | 12/2003 | White et al. | |
| 2003/0229881 A1 | 12/2003 | White et al. | |
| 2004/0040001 A1 | 2/2004 | Miller et al. | |
| 2004/0049747 A1 | 3/2004 | Yamasaki | |
| 2004/0237061 A1 | 11/2004 | Kahng et al. | |
| 2005/0066298 A1 | 3/2005 | Visweswariah | |
| 2005/0071788 A1 | 3/2005 | Bickford et al. | |
| 2005/0138581 A1 | 6/2005 | Usui | |
| 2006/0048081 A1 | 3/2006 | Kiel et al. | |
| 2006/0095237 A1 | 5/2006 | Wang et al. | |
| 2006/0141493 A1 | 6/2006 | West et al. | |
| 2006/0150129 A1 | 7/2006 | Chiu et al. | |
| 2006/0271907 A1 | 11/2006 | Izuha | |
| 2007/0006106 A1 | 1/2007 | Bartling | |
| 2007/0006109 A1 | 1/2007 | Bartling | |
| 2007/0136705 A1 | 6/2007 | Hosono | |
| 2008/0127028 A1 * | 5/2008 | Rittman | 716/19 |
| 2008/0250366 A1 * | 10/2008 | Ishikawa | 716/5 |
| 2009/0254874 A1 * | 10/2009 | Bose | 716/6 |

OTHER PUBLICATIONS

Agarwal et al., "Statistical Timing Analysis using Bounds and Selective Enumeration", TAU 2002, Dec. 2-3, 2002, Monterey, CA, p. 29-36.

Agarwal et al., "Statistical Timing Analysis for Intra-Die Process Variations with Spatial Correlations," Proceedings of the International Conference on Computer Aided Design (ICCAD'03), Nov. 11-13, 2003, San Jose, CA, p. 900-907.

Agarwal et al., "Computation and Refinement of Statistical Bounds on Circuit Delay," DAC 2003, 348-353 (2003).

Agarwal et al., "Variational Delay Metrics for Interconnect Timing Analysis," DAC 2004, Jun. 7-11, 2004, San Diego, CA, p. 381-384.

Choi et al., "Timed Pattern Generation for Noise-on-Delay Calculations," DAC 2002, Jun. 10-14, 2002, New Orleans, LA.

Daga et al., "Automated Timing Model Generation," DAC 2002, Jun. 2002, New Orleans, LA.

"Deep-Submicron Signal Integrity," Magma Design Automation, Inc., White Paper, 2002.

"Delay Calculation Meets the Nanometer Era", Cadence Design Systems, Inc., Technical Paper, 2004.

Jess et al., "Statistical Timing for Parametric Yield Prediction of Digital Integrated Circuits," DAC 2003, Jun. 2-6, 2003, Anaheim, CA, p. 932-937.

Kahng, "Static Timing Analysis," ECE260B—CSE241A, Winter 2004.

Le et al., "STAC: Statistical Timing Analysis with Correlation," DAC 2004, Jun. 7-11, 2004, San Diego, CA, p. 343-348.

Liou et al., "False-Path-Aware Statistical Timing Analysis and Efficient Path Selection for Delay Testing and Timing Validation," Jun. 13, 2002.

Odabasioglu et al., "PRIMA: Passive Reduced-Order Interconnect Macromodeling Algorithm", IEEE Transactions on Computer-Aided Design of Integrated Circuits and Systems, 17:645-654 (1998).

Orshanksy et al., "Fast Statistical Timing Analysis Handling Arbitrary Delay Correlations," DAC 2004, Jun. 7-11, 2004, San Diego, CA, p. 337-342.

Orshanksy et al., "A General Probabilistic Framework for Worst Case Timing Analysis," DAC 2002, Jun. 10-14, 2002, New Orleans, LA.

Scheffer, "Explicit Computation of Performance as a Function of Process Variation," TAU 2002, Dec. 2-3, 2002, Monterey, CA.

Scheffer, "The Count of Monte Carlo," TAU 2004.

Shrivastava et al., "Accurate and Efficient Gate-Level Parametric Yield Estimation Considering Correlated Variations in Leakage Power and Performance," DAC 2005, Jun. 13-17, 2005, Anaheim, CA.

van Langevelde et al., "PSP Model," Nat. Lab. Unclassified Report NL-TN 2005/00303, Apr. 2005.

Visweswariah et al., "First-Order Incremental Block-Based Statistical Timing Analysis," DAC 2004, Jun. 7-11, 2004, San Diego, CA, p. 331-336.

\* cited by examiner

MULTI-ENGINE STATIC ANALYSIS

CROSS-REFERENCE TO RELATED APPLICATIONS

This application is related to U.S. application Ser. No. 11/439,100, titled "Silicon Correlation," filed May 23, 2006, which is incorporated herein by reference.

This application is also related to the following concurrently filed applications, which are incorporated herein by reference: U.S. application Ser. No. 11/566,511, "Incremental Static Analysis" and U.S. application Ser. No. 11/566,606, "Distributed Signal Integrity Analysis".

BACKGROUND

This invention relates to static analysis of circuits.

Computer-aided design (CAD) and electronic design automation (EDA) tools have been applied to design of integrated circuits. One aspects of such tools relates to analysis of circuits to predict characteristics such as timing and power consumption. For example, given a circuit of interconnected gates, and fabrication characteristics of the gates and the interconnects, tools are available today that predict timing characteristics including delay characteristics through different parts of the circuit. These timing characteristics can be used to identify critical timing paths, for example, that may limit the achievable clocking speed of the circuit. Commercial tools for integrated circuit design are available from vendors including Synopsys, Inc., and Cadence Design Systems, Inc.

Computational requirements of design tools generally increase as the number of elements in circuits grow, and as the complexity of the analysis being performed increases. For example, timing analysis can be performed using a statistical framework rather than relying on best-case and worst-case limits but such statistical analysis requires more computation. Also, as circuits become more complex, more iterations of circuit refinement may be needed, further increasing the computational requirements. Some analysis makes use of iterative computations, for example, in order to determine signal integrity characteristics of a circuit, which relate to interaction between signals on different signal lines. As circuits become more complex, such iterative techniques can result in computation times that grow faster than the growth in the size of the circuits being analyzed.

With today's analysis tools, parallel processing approaches using multiple computers and/or multiple processors in a single computer running separate processing threads do not, in general, themselves provide the computational speedups required to compensate for the increased computation requirements. For example, bottlenecks such as memory access can remain, and iterative techniques and repeated analysis after circuit modifications can outstrip available gains through parallel processing.

During a circuit design and refinement process using currently available tools, analysis is generally begun anew after each circuit modification. This approach further increases computation costs as more circuit refinements are needed for complex circuits.

SUMMARY

In one aspect, in general, an approach to static circuit analysis makes use of parallel processing that is arranged in a way that avoids bottlenecks, such as at least some memory access bottlenecks resulting from data structure locking.

In another aspect, in general, a system for circuit timing analysis includes a database for holding results of execution of portions of a timing analysis computation. Multiple computation modules are configured for concurrent execution of the portions of a timing analysis computation, for example, a static circuit timing analysis computation. A control subsystem is coupled to the database and to the computation modules, and is configured to receive results of the portions of the computation from the computation modules and to update the database using the received results. Based on the received results, the control module selects further portions of the computations for computation and assigns each selected portion to one of the computation modules.

Aspects can include one or more of the following features.

The system further includes a first queue coupled to the control subsystem for receiving the results from the computation modules and for providing the received results to the control subsystem.

The control subsystem includes an aggregator configured to select the further portions of the computations.

The control subsystem includes an a second queue coupled to the aggregator for receiving entries identifying the selected portions.

The control subsystem includes a dispatcher for assigning each selected portion to one of the computation modules.

The system includes multiple interconnected servers, for example, computers interconnected by a data network.

Each server includes an instance of the control modules, an instance of the database, and an instance of the plurality of computation modules. For example, each instance of the database includes data need for and/or produced by computation modules on that server.

The control subsystem on each of at least some of the servers is configured to send selected to the results received from computation modules on that servers to control modules at other of the servers.

The control module on each of at least some of the servers is configured to receive results of the portions of the computation from other of the servers, and based on the received results to select further portions of the computations and assign each selected portion to one of the computation modules at that server.

The control module on each of at least some of the servers is further configured to update the database at that server using the received results from the other of the servers.

Each portion of the timing analysis computation is associated with a corresponding portion of an integrated circuit.

Each computation module is hosted on a different processing unit of a parallel processing system.

Each processing unit comprises a separate processing core.

In another aspect, in general, a method for circuit timing analysis includes dispatching portions of a timing analysis computation to multiple computation modules. The computation modules are configured for concurrent execution of the computations. A database that includes a storage for holding results execution of the portions of the computation on the computation modules is maintained. Results of the portions of the computation are received from the computation modules and the database is updated using the received results. Further portions of the computations are selected based on the received results, and each selected portion is assigned to one of the computation modules for dispatching to the computation module.

Aspects can include one or more of the following features.

Receiving the results from the computation modules involves enqueuing the results in a queue, and dequeuing the results from the queue.

Maintaining the database includes providing the computation modules access to the database without requiring synchronization of the access.

Providing the computation modules access comprises providing access to results of portions of the computations performed by the computation modules.

For each received result, a determination is made if the result is needed for execution of a portion of the computation at a remote system, and if so, the result is sent to the remote system.

Results of portions of the computation executed are received at a remote system and further portions of the computations are selected based on the results received from remote systems.

Aspects can include one or more of the following advantages.

Using a control subsystem that aggregates results from multiple computation units before the results are written to a database can improve efficiency over having the computation units write to the database directly by avoiding having to lock writeable portions of the database in order to mediate between the computation units.

Distribution of computation across multiple servers can reduce execution time by applying more computation resources to an analysis. Using multiple instances of results databases, which do not require mediation for writing by multiple servers, can reduce the overhead as compared to using a centralized database for the results.

Using an aggregation process that combines results from computation units on the same server as the aggregation process as well as results computed on other servers that may be needed by that server avoids having to lock writeable portions of the portion of the database on that server in order to mediate between writes for locally computed results and remotely computed results.

Reduced computation time for circuit analysis can have significant impacts on a circuit design process. For example, reducing computation time from hours to minutes can support an interactive rather than batch processing model.

Processing approaches that do not scale more than linearly with circuit complexity cannot "keep up" with circuit complexity. For example, in the past, circuit complexity has grown faster than the achievable computation time for circuit analysis, even taking into account growth in processing speed available over the same periods. However, applying approaches described above can provide computation speedup that scales with computer processor resources (e.g., number of processor cores, central processing units (CPUs), or servers) and therefore may keep up with the complexity of circuits being analyzed.

Other features and advantages of the invention are apparent from the following description, and from the claims.

DESCRIPTION

Figure 1:
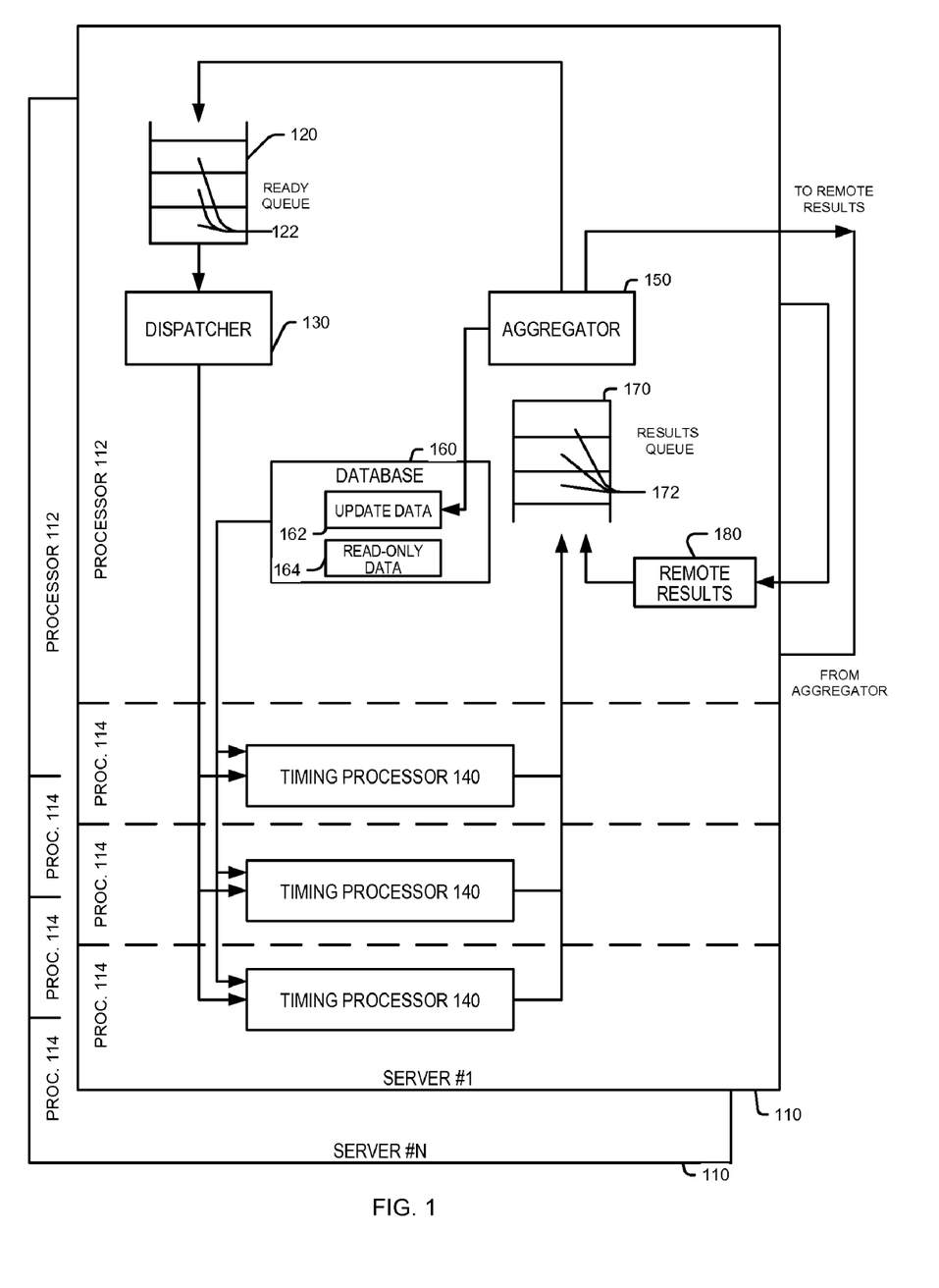
FIG. 1 is a block diagram of a parallel processing system for circuit analysis.

Referring to FIG. 1, a processing system for circuit analysis 100 makes use of a number of computing servers 110, each of which includes a number of processors 112, 114. The term "server" should be understood broadly. For example, each server 110 can be a separate computer, and each processor 112, 114 can be a separate central processing unit (CPU) or processor core capable of executing a separate operating system process or processing thread. The circuit analysis approaches described below statically and/or dynamically assigns portions of an analysis computation to various of the processors 112, 114. Each processor 112, 114 does not necessarily have to be identical. For example, one processor 112 may be suited to general control tasks, whereas other processors 114 may be best suited to numerical computations.

Each server 110 includes or is associated with a database 160, such that together the databases 160 on the various servers (which together can be considered as one overall database with a distributed implementation) hold the data for the circuit analysis being processed by the system. The term "database" should be understood broadly. For example, each database 160 may comprise data in a semiconductor memory or on a disk memory system in or associated with a server. The database 160 be arranged as a database processing system (e.g., as a relational database) or may make use of other data structure arrangements in the memory. In some examples, each database 160 includes a portion that includes update data 162 that is generated on that server, and portion for read-only data 164, for example, that may be needed as input by the processors 140 but not necessarily generated or updated on that server 110. In some examples, the "database" that is on a server comprises an interface to an external data storage system that provides the functionality of a fully local database.

In some examples, only a single server 110 is used, or each server 110 includes only a single processor 114, and in some examples, such as examples with only a single processor 114, certain functions (such as that of the dispatcher 130 and/or the aggregator 150. which are described below) may not be required.

In the system shown in FIG. 1, each server 110 hosts a number of control modules, and each processor 114 hosts a timing processor 140, which is a computation module that performs the computations for determining the timing characteristics at various gates and signal lines in the circuit being analyzed. The control and computation modules communicate, for example, using message passing services provided by an operating system that coordinates execution of the modules. The modules shown in FIG. 1 can be implemented, for example, as separate operating system processes, or may be separate "lightweight" processes, execution threads, or other separate or combined execution flows.

The control modules, which are hosted on the processor 112, together determine which computations are to be performed by the computation modules on the other processor 114. The control modules form a subsystem that includes a ready queue 120, which includes work units 122 for tasks that are ready to be performed by an available timing processor 140, a dispatcher 130, which assigns the work units to particular processors 140, and an aggregator 150, which takes the results from the tasks performed by the processors 140, and updates the database 160 with the results. Operation of the various modules is discussed in more detail below after a discussion of the tasks required for processing.

Figure 2:
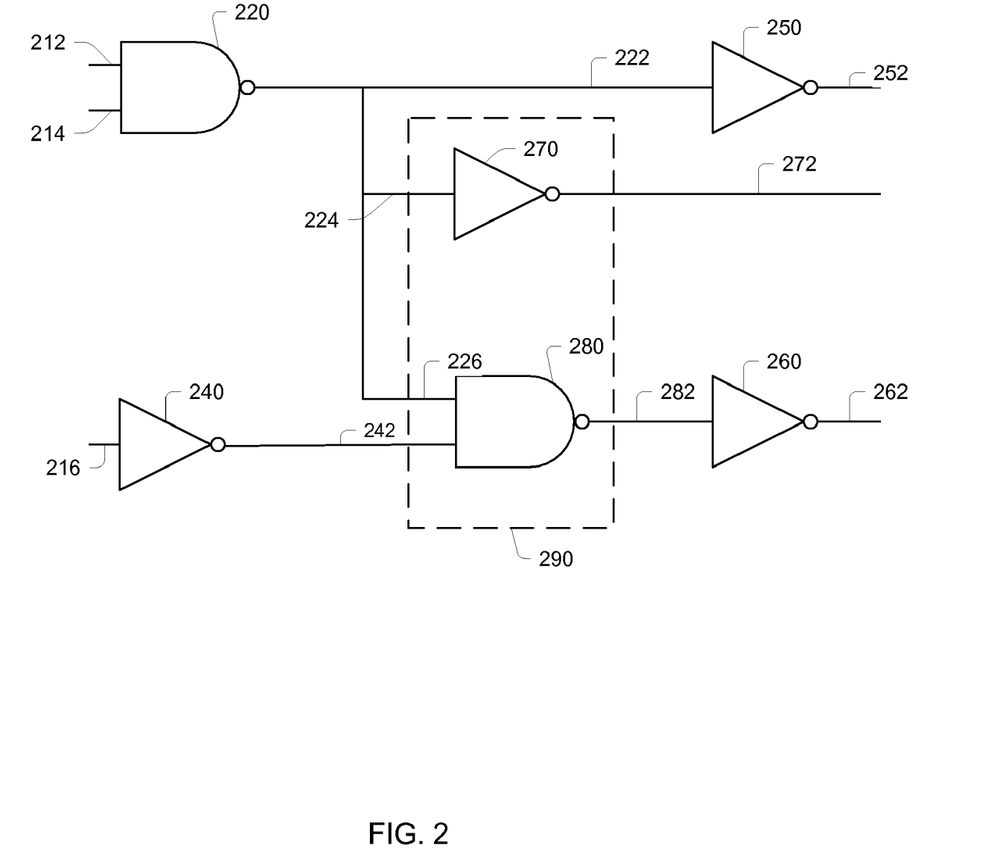
FIG. 2 is a portion of a logic circuit.

Referring to FIG. 2, a portion of a logic circuit 200 includes a number of gates (220, 240, 250, 260, 270, 280) that are linked by interconnects (222, 224, 226, 242, 282). Note that although the circuit 200 is represented schematically in FIG. 2, the gates and interconnects (together referred to below as the circuit elements) are associated with a physical layout of an integrated circuit, and the characteristics of the circuit elements are generally determined at least in part based on that physical layout. For example, during a design process, a change in the design can include one or more of a change in the arrangement and interconnection of the circuit elements, a change in the physical layout of the circuit elements, and a change of parameters or module structure used to determine timing characteristics in the circuit.

As an example of a static timing analysis performed by the system, timing characteristics of output signal lines of a gate are determined by propagating the timing characteristics of the input signals through the gate. For example, one characterization of timing characteristics includes an earliest time (relative to the clock period), a latest time, and a slope for each of a rising and a falling signal transition. That is, such a characterization includes six real numbers. Each type of gate, such as a two-input NAND gate, has a formula or a computation procedure that takes the timing characteristics of the inputs to determine the timing characteristics of the outputs. With branching of an output of a gate, the signal at each destination is treated as a separate output that may have different timing characteristics. For example, in FIG. 2, NAND gate 220 is treated as having two outputs 222 and 224.

Referring to FIG. 2, the signal timing can be propagated through the gates until the characteristics of all the signal lines has been determined. Note that the gates are generally arranged to form combinatorial logic without loops with no intervening clocked elements and that therefore there is an order of the computations that evaluate each gate. Note that some types of computations, such as signal integrity computations, cannot be sorted in this way and require iterative calculation. Approaches to performing iterative calculations are addresses later in this description.

Referring again to FIG. 1, the ready queue 120 holds work units 122 for each of the computations that are ready to be performed. An example of such a work unit relates to propagation of signals through a single cell or gate, such as an inverter or a NAND gate, based on the signal characteristics of the inputs to that cell or gate. Each of the work units 122 either literally holds the needed information for the computation, or refers to data in the read-only data 164 or previously written update data 162 of the database 160 on the server. Note that the distinction between the read-only data 164 and the update data 162 in database 160 does not have to be an architectural division of the database. It is sufficient that the division is logical such that records in the read-only data 164 are not updated during the iteration of computations executed by the processors. Similarly, update data 162 remains unchanged once initially written, and therefore is also treated as "read only". As an example, one work unit 122 in the ready queue 120 may be associated with NAND gate 220 in FIG. 2, with the data structure including or referring to data characterizing the timing of inputs on input lines 212 and 214.

Figure 3:
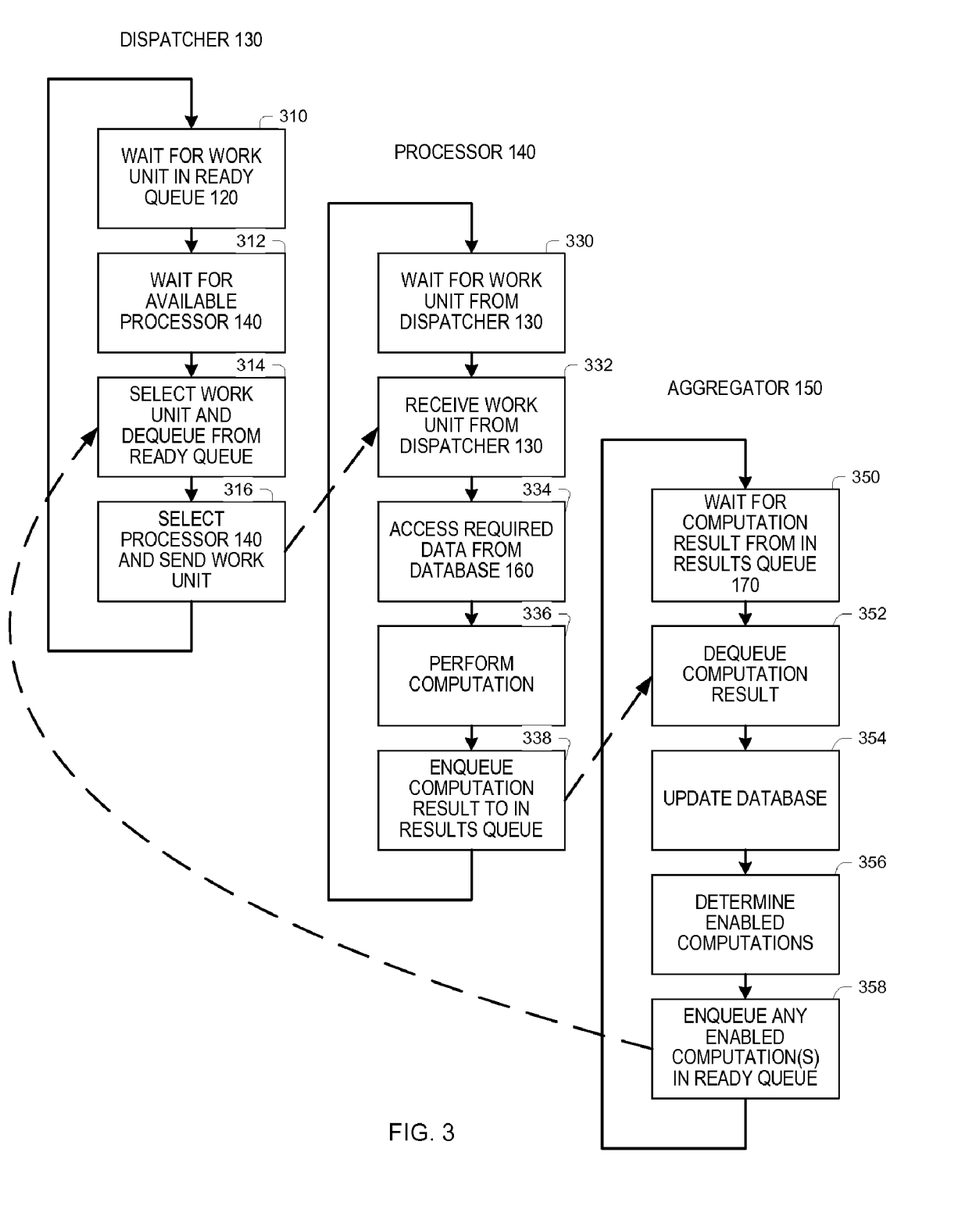
FIGS. 3 and 4 are flowcharts.

Referring to the flowcharts in FIG. 3, the dispatcher 130, each of the timing processors 140, and the aggregator 150 function asynchronously and are synchronized through the ready queue 120 and a results queue 170. In the description below, an example with a multi-processor single server 110 is first described. Additional features to support multiple servers 110 are described later.

The dispatcher 130 waits for a work unit to be available in the ready queue (step 310). Note that the timing of certain input signals, such as inputs to the circuit as a whole, are known before starting the computations, and timing of some signals does not depend on other signals, for example, signals that are output from clocked elements such as latches. Therefore, the ready queue 120 is initially populated with computations that can be initially performed based on timing of externally-provided signals (or possibly for gates that have no inputs). For example, in the example shown in FIG. 2, the computations for NAND gate 220 and inverter 240 can be initially performed based on timing of inputs to the circuit 200 as a whole. In general, a work unit in the ready queue corresponds to a gate (or some other unit of circuitry in general) for which all the inputs are known and therefore the gate is "ready" for computation and propagation of timing characteristics through it.

If there are one or more work units 122 in the ready queue 120, the dispatcher 130 waits for an available timing processor 140 (step 312). The dispatcher 130 then selects a work unit 122 and dequeues it from the ready queue 120 (step 314) and then selects the available processor 140 and sends the dequeued work unit to the selected processor (step 316).

Each of the processors 140 work asynchronously of the dispatcher. The processor 140 waits for a work unit to be sent from the dispatcher 130 (step 330) and received the work unit 122 sent from the dispatcher (step 332). The processor 140 then accesses any required data from the database 160 (step 334). For example, the processor accesses the values characterizing the input timing (if they are not literally in the work unit) and parameters characterizing the gate being analyzed. Note that the records accessed by the processor are guaranteed not to be changed during execution of the computation and therefore, the records are treated as read-only and do not necessarily have to be locked.

The processors 140 perform their computations asynchronously of one another (step 336), and the result of computations are stored in the database 160 so that they can be used as inputs for subsequent computations. In order to avoid contention in writing to the database, each processor 140 sends its result to the aggregator 150 by putting the result in the results queue 170 (step 338). The aggregator 150, dequeues the results and stores the results in sequence in the database 160 in the update data 162 portion of the database. The merger also performs the dependency computation to determine when new computations should be enabled based on the newly computed signal data.

For the circuit in FIG. 2, initially, computations for gates 220 and 240 may be performed by different processors 140 concurrently. When the computation for gate 220 has completed, computations for gates 250 and 270 can be performed concurrently. When the computations for both gates 220 and 240 are completed, then the computation for gate 280 can be performed, and at its completion, the computation for gate 260 can be performed. The aggregator 150 waits for a computation result to be available in the results queue 170 (step 350). It then dequeues the computation result (step 352) and updates the database 160 based on the result (step 354). The aggregator 150 determines the computations (i.e., selects from the computations not yet executed) that are newly enabled based on the new results written to the database (step 356) and enqueues the enables computations, if any, in the ready queue (step 358).

Note that there is no ordering requirement for the dispatcher 130 to dequeue computations from the ready queue 120. For example, if the processors 140 are not identical, or the computations require different resources (e.g., computation time, working memory), the dispatcher may schedule the computations out of order, which are hosted on processors 114.

In general, the computation required by the processors 140 exceeds that required by the control modules, such as the dispatcher 130 and aggregator 150, which are hosted on processor 112. Therefore, the control modules do not form a bottleneck for the overall process. Furthermore, the work of the aggregator 150 is pipelined with the processors 140 such that once a processor 140 queues the result of a computation, it is ready to accept a new computation from the dispatcher 130, even before the previous results are committed to the database 160.

The processors 140 only read from the database 160, while the aggregator 150 writes the data that will be needed by computations that are enqueued only after their needed data has been written and those records have logically become read-only.

In this single-server example, processing continues until computations for all the gates have been performed. Assuming there are no cycles in the combinatorial circuitry being analyzed, this occurs when the ready queue 120 and results queue 170 are empty and all the processors 140 are idle. If there is a cycle in the circuit, then a deadlock may occur, and conventional static timing analysis techniques are used to resolve the deadlock, for example by breaking the cycle. That is, in the absence of cycles, for the ready queue 120 to be empty and no computations remaining being processed by the processors 140 or aggregator 150, there must not be any gate that has not had the timing of all it's input signals generated by a previous computation, because if such input exists, there is some other upstream gate that should have itself been computed earlier.

The approach described above for computations involving single gates or cells can be extended to deal with computations for groups of cells. For illustration, in FIG. 2, gates 270 and 280 can form a group 290. Many more gates can be combined in a group. For example, an entire processor core with hundreds of inputs and outputs can be handled as group. Similarly other groupings can be based on gates laid out in a particular geographic area of a chip, topologically connected regions, or gates grouped more or less arbitrarily such as according to symbolic labels assigned during the design process (e.g., gates with labels starting with "A" can even form a group). An optional feature is that these groupings may be hierarchical with nested groups, but such nesting is not required. All the gates in any particular group are handled by a single server 110.

In examples described above, a single server 110 is used to perform the analysis. In another example multiple servers 110 are used. One server acts as a "master," while the remaining servers act as "slaves." Each gate is assigned to a particular corresponding server 110. For example, gates are grouped (such as the group 290 in FIG. 2) and groups are assigned to corresponding servers 110.

Figure 4:
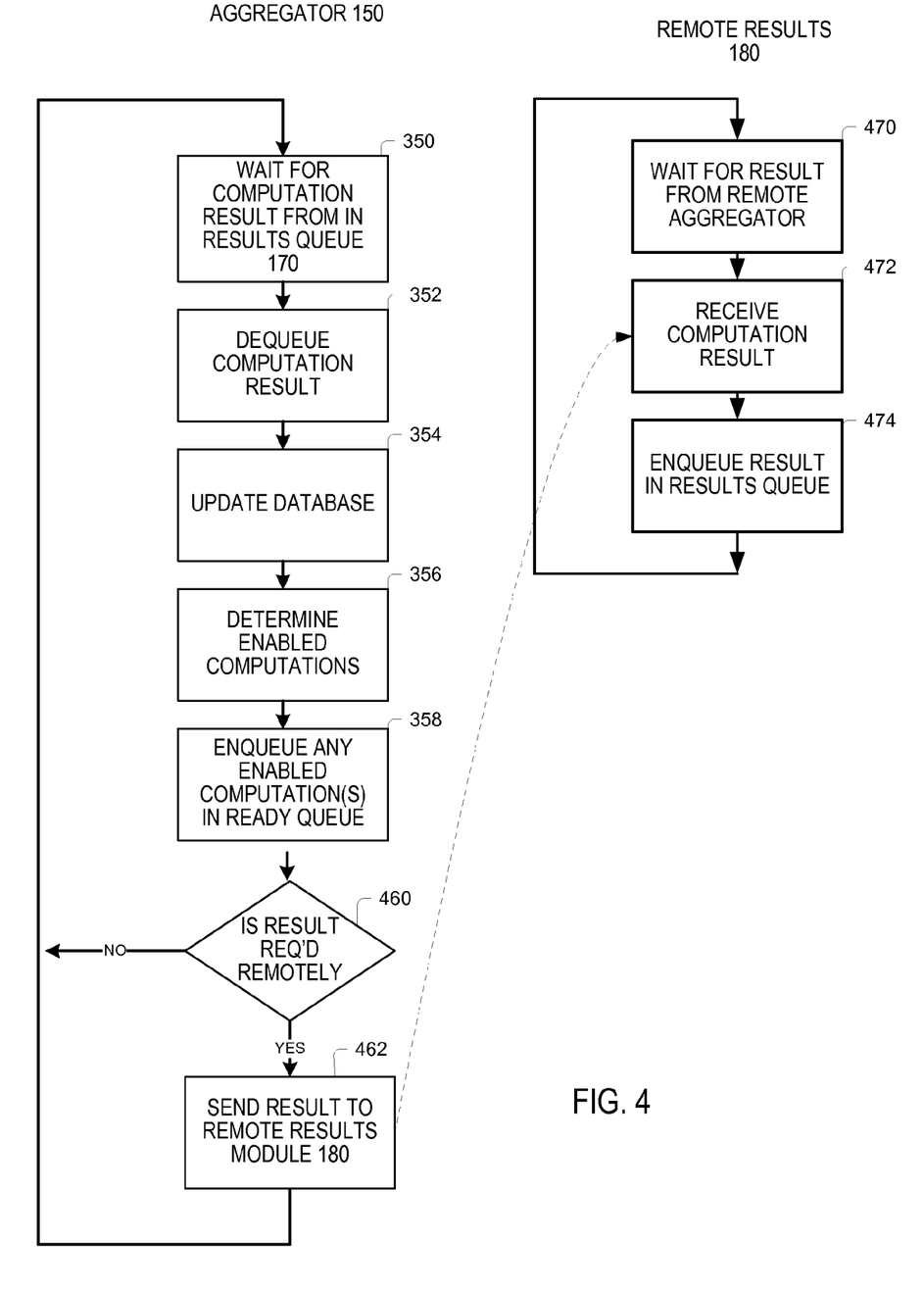

Referring to FIG. 4, in the multi-server example the aggregator 150 processes the results queue 170 in steps 350-358 as described above for a single server system. After enabling computation on the local server (step 358), the aggregator 150 checks to see if the result is needed on a remote server (step 460), for example because a downstream gate is owned by a different server. If so, the aggregator sends the result to the appropriate remote results module (step 462). At the remote server, the remote results module 180 waits for a result (step 470) and then receives it (step 472) and enqueues the received result in the results queue (step 474).

Each server 110 has a separate and independently operating database 160. As described above, the database 160 is partitioned into read-only data 164, which holds "inputs" and update data 162, which holds "results." For example, the inputs include device parameters, such as parasitic capacitances in the circuits. These inputs are shared and distributed to all the servers and stored in the read-only data 164 of the databases 160. The update data 162 on each server 110 includes the data associated with timing outputs of gates allocated to ("owned by") that server.

As introduced above, when the aggregator 150 computes data for a signal that leads to a remote cell or group, it broadcasts the data to the server 110 that "owns" the gate to which that signal leads. For example, if in FIG. 2 group 290 is assigned server #2 and all the other gates are handled by server #1 (e.g., the "master" server), when the computation for gate 220 is complete, the aggregator 150 enables computation for gate 250 on server #1, and also sends the data characterizing timing on inputs 224 and 226 to server #2.

At each server, timing information for a signal line that is received from another server is handled by a remote results module 180, which queues the received results in the results queue 170 as if it was generated by a processor 140 on that server. That is, the received data, which is structured as a timing result produced by a server 140 is passed to the aggregator 150 on that server, which then writes the data with no contention to the database 160 on that server, and determines which new computations on that server can be performed. For example, if server #2 receives data for signal lines 224 and 226 from server #1, the aggregator 150 on server #2 writes that information to its database 160, and then determines what further computations might be enabled. In this example, inverter 270 has only the single input, and therefore, a computation for inverter 270 is enabled at server #2. The computation for NAND gate 280 is deferred if the input 242 is not yet available at server #2. When the computation for NAND gate 280 has completed, the aggregator 150 on server #2 determines that the data for signal line 282 is needed at the server (in this case because the group 290) is exited, and therefore, the aggregator 150 on server #2 sends the timing information for signal line 282 to the aggregator 150 on server #1. This causes the computation for inverter 260 to be queued on server #1. Note that data for signal lines that span servers is written in the database for the server that owns the line, but is sent to the other servers that need those signals as well, where they are also written to the databases 160.

The description above focuses on timing analysis for which the computations can be ordered essentially according to a topological sort of the circuitry so that computations start at the inputs (or outputs of clocked elements) and end at the outputs (or inputs to clocked elements). In situations in which the elements cannot be sorted, for example due to signal loops, resulting deadlocks are dealt with, for example, essentially by ordering the computations.

When the timing calculations include signal integrity factors, the timing on a signal line not only depends on the gate driving that signal line and the timing of its inputs, it also depends on signal timing of other "aggressor" signal lines that are in the vicinity of the "victim" signal line or otherwise influence its timing characteristics. When one considers such signal integrity factors, the calculations cannot in general be topologically sorted. A conventional approach to performing signal integrity calculations is to iteratively redo the computations by updating the timing of each signal line until the process converges to a stable set of timing characteristics (which take into account the signal integrity factors) for all the signal lines in the circuit.

An approach to signal integrity calculations described more fully below can take advantage the distributed computation approaches (e.g., using multiple servers) described above, and further incorporate incremental and iterative aspects. In this description, we refer to a gate as "ready," as earlier in this description, if computation of the gate's timing characteristics can be performed then the gate is "ready" and a work unit for such a computation is in a ready queue 120 of the system. We refer to a gate as "changed" at a particular iteration if in that iteration the timing of any one of its input signals has changed from the previous iteration (or more generally from the previous time that timing characteristic was computed). With reference to the distributed timing computation described above, when the first input of a gate is updated in the first iteration, that gate would first be marked as "changed." When the last of its inputs is computed, the gate is then marked as "ready" and a corresponding work unit is put in the ready queue. Related to signal integrity calculations, we refer to a gate as "dirty" if one or more of its inputs have been invalidated by a new timing result for an aggressor signal line for that input. In general, a consequence of a gate being made dirty by data updated in the $(i-1)^{st}$ iteration is that the timing for that gate will be recomputed in the $i^{th}$ iteration. At the $i^{th}$ iteration, all initially "dirty" gates recomputed (i.e., by marking initially dirty gates relabeled as "changed") so that they are guaranteed to be recomputed. Newly "dirty" gates resulting from new timing results computed in the $i^{th}$ iteration are also kept track of, and their recomputation is deferred until the next $(i+1)^{st}$ iteration.

Figure 5:
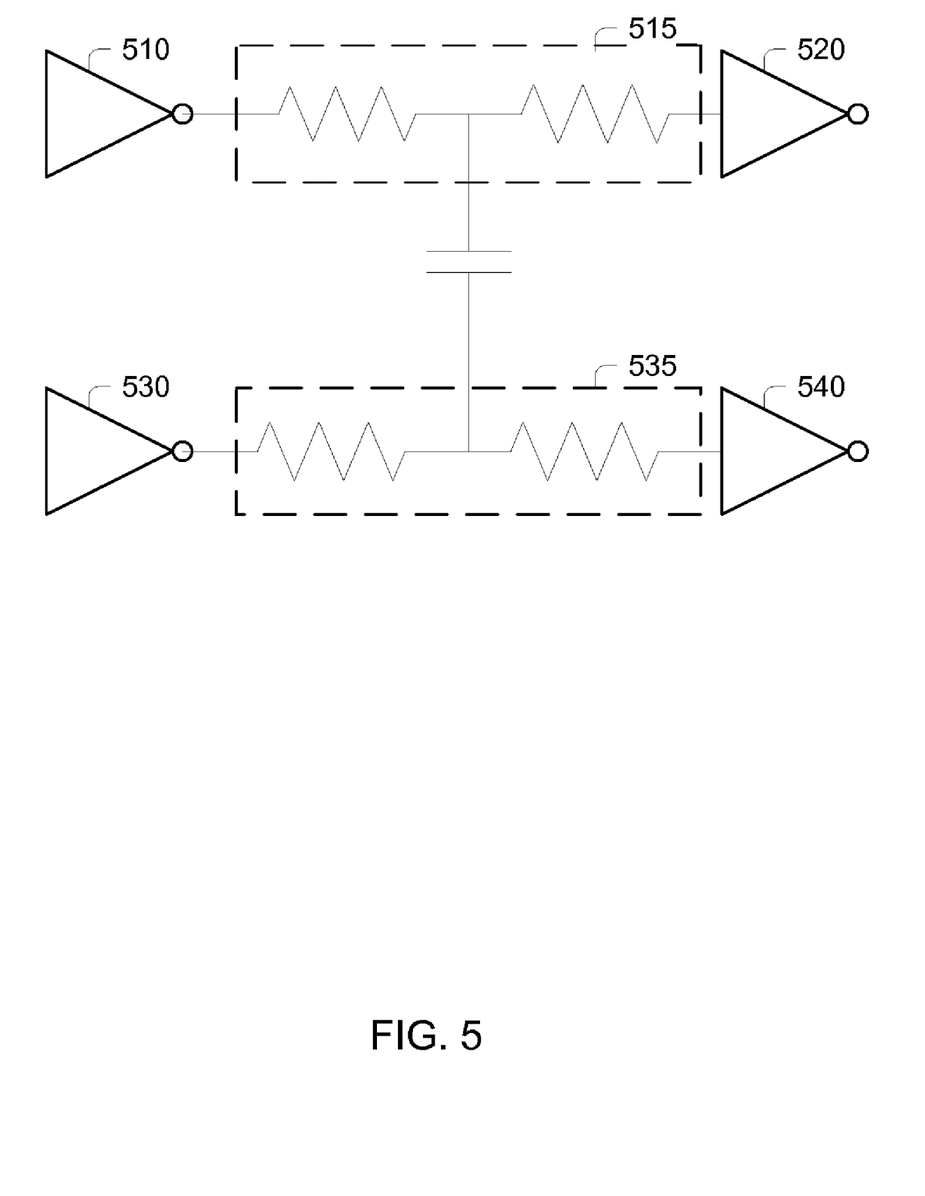
FIG. 5 is a circuit diagram.

As an example related to signal integrity calculation, FIG. 5 shows a schematic representation of two signal lines 515, 535 whose interaction is modeled with lumped elements. In such a model, the timing of the signal on signal line 515 depends on the timing of the input to the inverter 510 as well as on the timing of the signal on signal line 535. Similarly, the timing of the signal on signal line 535 depends on the input of the inverter 530 as well as on the timing of the signal on signal line 515.

In a single-processor iterative implementation, there is no contention for writing the updated signal characteristics for the two signal lines, and therefore the signal characteristics of the two signal lines can be iteratively recalculated and updated (i.e., overwritten in place) after each calculation.

In a distributed multiple processor implementation, for example, using the scheduling approach described above, contention in access to the database 160 may result. For example, if computations associated with both inverters 510 and 530 are performed concurrently, the timing characteristics of each of the signal lines 515 and 535 could both be updated as well as read in the database, thereby requiring locking of the database.

A preferable multiple processor implementation allows for iterative computation without resulting in contention in the databases 160. Rather than using an over-writing approach to update the timing characteristics of the signals, updates at different iterations are stored in different records of the database. For example, in FIG. 5, the timing characteristics of signal line 515 at the $i^{th}$ iteration makes use of the timing characteristics of the input signal lines to the inverter 510 computed at the $i^{th}$ but the signal characteristics of signal line 535 at the $(i-1)^{st}$ iteration. The old $(i-1)^{st}$ iteration data is treated as read-only data during the $i^{th}$ iteration, and therefore this avoids contention in the databases.

Figure 6:
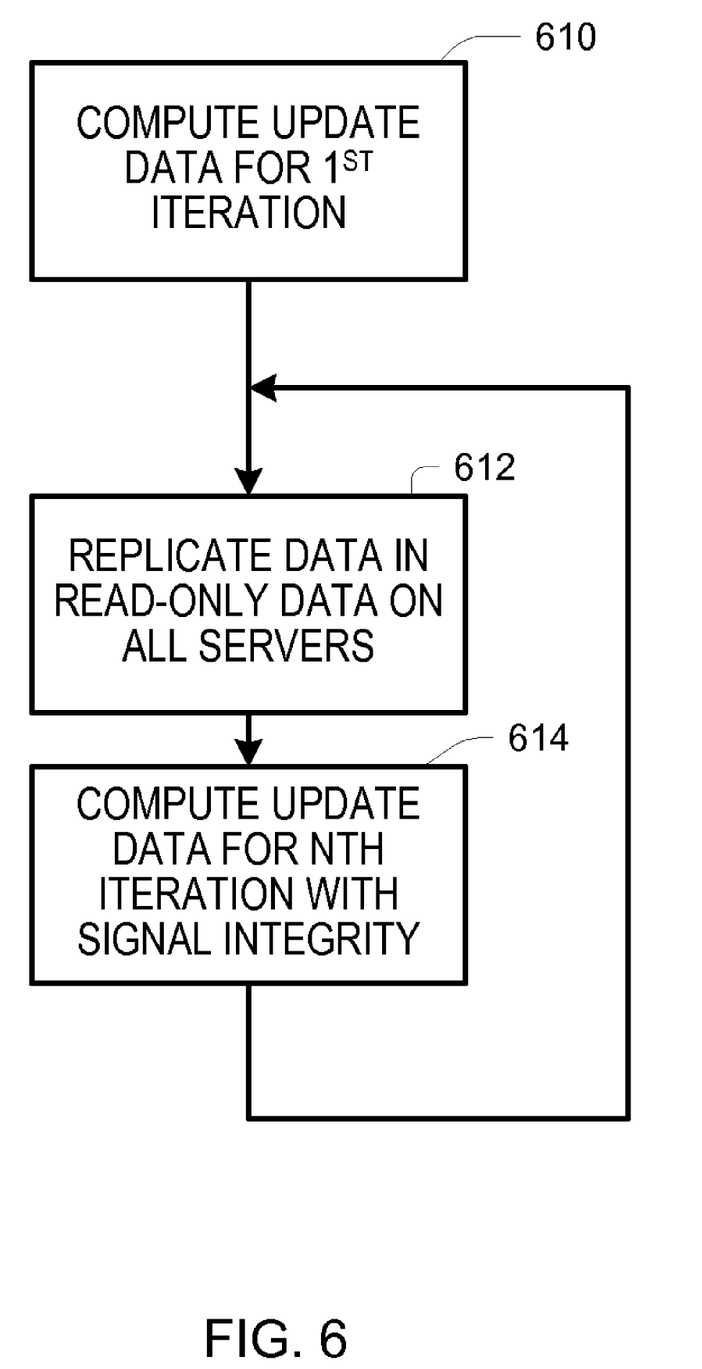
FIGS. 6 and 7 are flowcharts.

Referring to FIG. 6, one approach to coordinating this distributed iterative signal integrity calculation is to first compute the timing information for a first iteration ignoring signal integrity effects (step 610). For example, the approach described above for a multiple processor and/or multiple server implementation is used. At this point, each server 110 holds the timing information (for the $1^{st}$ iteration) for the gates that it "owns" in the update data 162 of its database 160.

The servers 110 next exchange this update data so that each server has at least the data it needs from the first iteration for the next iteration in the read-only data 164 of its database 160 (step 612). For example, each server has sufficient information to know which gates its signals may effect, and which servers are responsible for computation of those other signals.

Note that the exchange of data is simplified by the fact that the data from the $1^{st}$ iteration is read-only after completion of the first iteration. The servers then together compute the update data propagating timing information for the $2^{nd}$ iteration through the circuit and taking into account signal integrity effects using the $1^{st}$ iteration timing data (step 614). The iteration of data exchange and distributed computation can be repeated numerous times, in each iteration first distributing required information to the read-only data 164 of each server, and then performing the computations for the next iteration.

Other approaches to sequencing the computations may be used. For example, it is not strictly necessary to initiate each iteration in lock step on each of the servers or for each server to hold a complete copy of the timing information for all signal paths. For example, the read-only data 164 may hold data for a number of iterations, and computation results may be exchanged between the aggregators 150 for signal integrity purposes in the same way as data is exchanged for timing propagation purposes. In this way, each database 160 may hold multiple iterations of timing information for each of the gates that it owns, and all the previous iterations of timing data for "aggressor" signals that effect the outputs of the gates that it owns.

An incremental approach is used for the $2^{nd}$ and subsequent iterations. In this incremental approach, not all gates have to be recomputed, thereby potentially reducing overall computation substantially. In general, at each subsequent iteration, a gate is recomputed only if the timing of one or more of its input signals has changed significantly (and therefore the gate is marked as "changed") or if even if none of the input signals has changed, but an aggressor signal computed at the previous iteration has changed and potentially influences one of the input signals of the gate (so that the gate was marked as "dirty"). Note however that there can remain numerous unchanged and clean (not dirty) gates which do not require recomputation at an iteration.

For example, referring to the example in FIG. 5, a sufficient change in the timing on signal line 535 at iteration (i−1) compared to iteration (i−2) results in marking of gate 520 as dirty, and therefore requiring recomputation at iteration i. On the other hand, if the change in the timing on signal line 535 at iteration (i−1) is insignificant as compared to the timing at iteration (i−2), or if the timing characteristics are such when compared to the timing at iteration (i−1) of signal line 515 would not impact the signal integrity analysis, then gate 520 is not marked as dirty, and therefore at iteration i gate 520 may not be recomputed unless the timing of signal line 515 where significantly update at iteration i.

Figure 7:
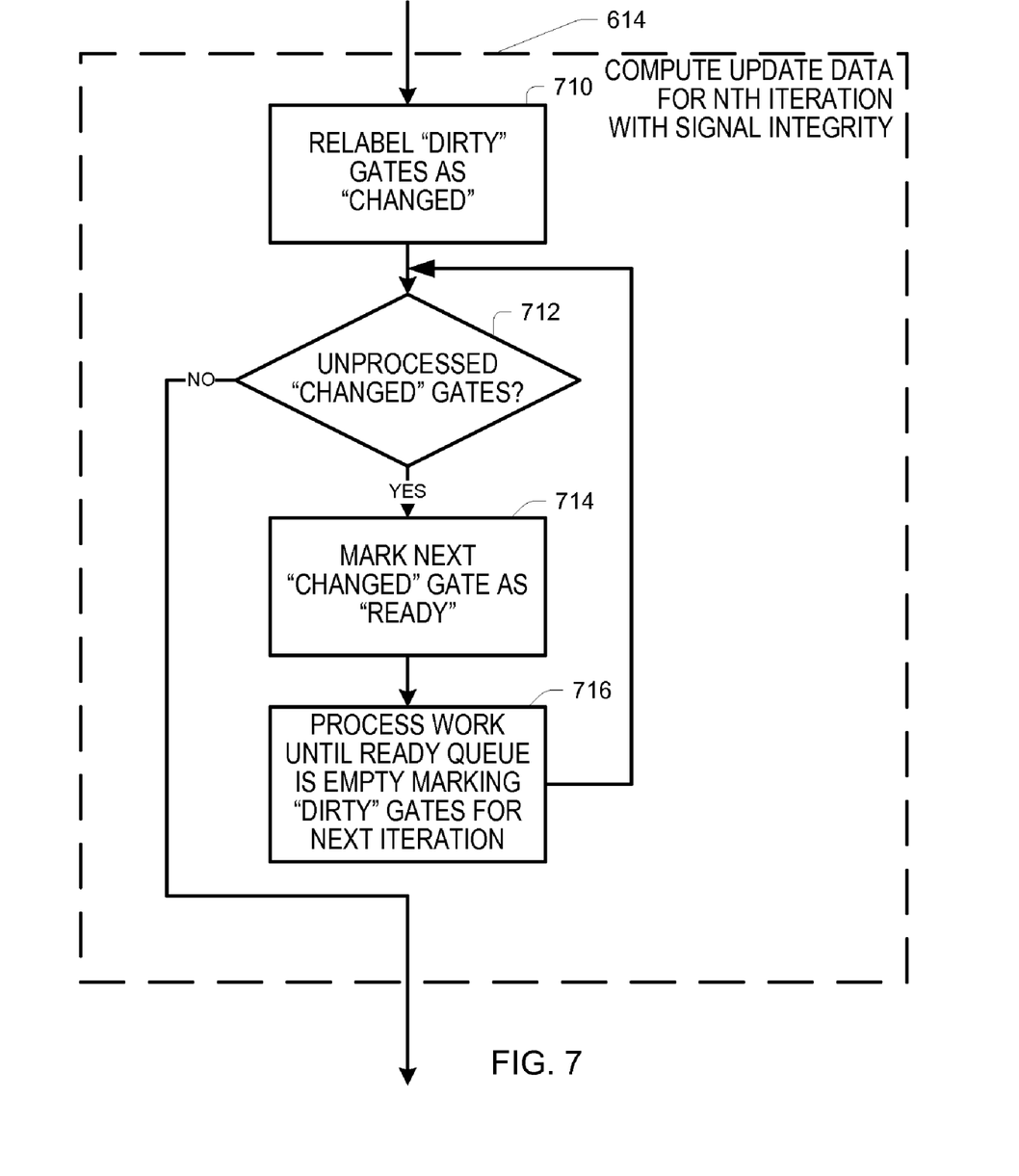

Referring to FIG. 7, the step 614 of computing the update data (see FIG. 6) itself can involve a number of steps. As indicated above, at the start of the iteration, all gates marked as "dirty" in the previous iteration based on signal integrity factors are relabeled as "changed" (step 710). Because not all gates are necessarily recomputed at each iteration, one of the "changed" gates is selected to be made as "ready" and put in the ready queue 120. This is done by first checking whether there are any changed gates that have not yet been processed (step 712). If there are no changed gates then the processing for this iteration is complete. If there is at least one changed gate, then the most "upstream" of the gates in the circuit (i.e., a first gate according to the partial ordering induced by the circuit topology) is chosen to be made ready (step 714). Putting the ready gate in the ready queue permits the process illustrated in FIG. 3 to commence at each of the one or more servers propagating timing through gates (step 716). A difference from the process in FIG. 3 is that if the timing of an output of a gate does not differ significantly from the timing at that output on a previous iteration, then the next gate is not marked as "changed" and essentially the updating of the timing does not propagate further. It is therefore possible that at the completion of the processing of step 716 there may remain changed but not yet processed gates in the circuit. In order to continue with the processing, the procedure loops back and a further check is made as to whether there remain changed gates (step 712). If such changed gates remain, a changed gate is marked as ready (step 714) and the processing restarts. Note that each server in a distributed implementation makes the decision of when to restart with another changed gate independently.

During this processing (starting with the $1^{st}$ iteration), as each new signal is computed, a decision is made based on signal integrity factors of whether any gate needs to be marked "dirty" for the next iteration. Note that a variety of rules related to the degree of change in the signal from the previous iteration, and the relationship of the signal as the aggressor signal to the target signal, affect whether any gates are marked as "dirty." Also, the rules or criteria applied in this decision may differ at different iterations, for example, applying more conservative (i.e., considering more signal interactions) rules in successive iterations.

As an example, during the processing in step 716 for the circuit shown in FIG. 2, certain of the computations may be avoided if the recomputation would not significantly affect the analysis. For example, if gate 240 is initially recomputed at the $2^{nd}$ iteration, but the output signal 242 is insignificantly changed (e.g., less than a threshold change), then gate 280 is not marked as changed based on the signal 242. If signal 226 is also not changed significantly, then no recomputation of timing propagation through gate 280 is needed. However, even though gate 280 is not recomputed, it is possible that gate 260 is later recomputed if it was marked "dirty" in the previous iteration, and therefore labeled as "changed" at the beginning of the $2^{nd}$ iteration.

For example, referring to FIG. 5, before recomputing the timing characteristics resulting from propagating the signal on line 515 through the inverter 520 at the $2^{nd}$ iteration, the possible effect of the timing of the signal on signal line 535 can be assessed, and if the signal integrity effect on signal line 515 would be negligible, then the such a recomputation for the inverter 520 can be skipped and the timing processor 140 emits a result to the results queue that indicates that the timing information is unchanged from the previous iteration. Similarly, if at the $3^{rd}$ iteration, the timing of the input to the inverter 510 is unchanged from the $2^{nd}$ iteration, and the signal integrity effect of signal line 535 as computed in the $2^{nd}$ iteration is not substantially different than that computed on the $1^{st}$ iteration, then the computation for the inverter 520 does not have to be repeated.

In general, as the aggregator 150 dequeues computation results (see step 352 in FIG. 3), it compares the new results with those already stored in its read-only data 164 from the previous iteration. It the new data for a particular signal path is the same as, or with a prescribed threshold or tolerance, with the previous result for that signal path, then propagation of that signal stops at that point. That is, the new data for that signal path codes not enable a computation that will result in new update data, which will be stored in the update data 162 of the server.

Various rules are also applicable for assessing whether a computation needs to be repeated. For example, one rule for determining whether to recompute the signal characteristics at the output of a gate at the $i^{th}$ iteration may be to look at the change in the transition region of an interfering signal path (from the $(i-2)^{nd}$ to the $(i-1)^{st}$ iteration) and if the transition region affects any of the gate's input signal lines, then the rule marks the gate as "dirty" and requiring recomputation in the $i^{th}$ iteration. A variety of rules can be used to prune out computations that do not need to be computed. For example, with statistical timing models, the rules may be different than those based on time windows. For example, the rule can take as input the switching window of the "victim" signal and the switching windows of the "aggressors" and how they have changed, and output a Boolean value indicating whether the "victim" gate needs to be recomputed. For example, a triangular approximation of the noise waveform can be used as a bound on the effect. Various thresholds on effective change can effect the accuracy of the iterative signal integrity calculation. The rule is conservative, serving to rule out some of the calculations.

In the incremental iterative approach described above, the rules used to determine whether changes are substantial or not may be parameterized, allowing for more accurate and potentially longer computation versus less accurate and potentially shorter computation. The parameters of the rules can be chosen and fixed for the analysis, and may even be varied during the iterative computation, for example, allowing the computations to converge for a relatively inaccurate parameterization of the rules and then changing the parameters and performing further iterations. The rules themselves may be changed, for example, using relatively conservative rules initially, thereby requiring more calculations, and then using less conservative rules as the computations converge.

As an alternative to identifying changed gates to be made ready in order to initiate processing, another option is to explicitly propagate unchanged timing signals through gates. That is, a gate for which all the input signals are unchanged from a previous iteration would propagate unchanged output signals. In such an alternative, gates are put on the ready queue in the same manner as in the first iteration, but gates with all unchanged inputs simply send unchanged output signals to the aggregator for further propagation through the circuit.

Another implementation, which can but does not necessarily involve signal integrity calculations, relates to modification of the circuit being analyzed. For example, suppose a single inverter, such as in FIG. 2 the inverter 240 is modified and that such a modification affects the delay characteristics of the inverter. Such a modification may occur if the signal path through gates 240, 250, and 260 forms a critical timing path, and a designer replaces inverter 240 with a lower-delay design. In order to compute the effect of the change, the entire circuit 200 could be analyzed anew. However, the effect of the change of inverter 240 may be limited, and not affect, for example, the analysis of gates 270 and 250, and perhaps even gate 260.

This implementation makes use of an incremental computation approach that is similar to the incremental signal integrity calculation described above. For example, if only gate 240 is changed, then it is marked as "changed" and all other gates are initially marked as unchanged. Therefore, using the procedure illustrated in FIG. 7, computation for gate 240 is initially queued in the ready queue 120. The timing information prior to the circuit modification has been retained in the read-only data 164 of the database, and therefore after the computation, the new timing on signal line 242 is compared to the old timing. If it is identical or insubstantially changed, then signal line 242 is considered "clean." Similarly, because the inputs to gate 220 are unchanged, and the gate 220 is itself unchanged in design or parameters, then its outputs are not recomputed and iterative processing stops after only updating gate 240. If on the other hand signal 242 changes significantly from the prior value, the gate 280 is marked as changed. However, because there is still one input (signal 226) that has not been updated in this iteration, gate 280 is not yet queued as ready. The processing phase completes with gate 280 still marked as changed but not yet processed, so in step 714, gate 280 is marked as ready and processing begins again. If its output 282 is changed, the inverter 260 is marked as changed and immediately queued as ready because all of its (one) input have been computed in this iteration.

Modifications to the circuit at an iteration can have various origins, including but not limited to changes in gate designs without changes in function (e.g., replacing an inverter with a different inverted), changes to the modeled parameters of a gate for example based on measurements of fabricated chips, re-routing of signal lines on a device, or changes to the circuit design itself (either maintaining the same logic function or changing it, for example, to correct a design flaw). With respect to changes in modeled parameters of the gates, techniques described in co-pending U.S. application Ser. No. 11/439,100, titled "Silicon Correlation," can be applied by retaining the data for one or more iterations prior to analysis of a fabricated device, and then using incremental analysis techniques when new parameters are know. In some cases, the parameter changes may be relatively localized, thereby limiting the impact of the changes and allowing relatively little recomputation to be required. For example, localized changes may include voltage drop and temperature such that gates in a physical neighborhood may experience the localized change in voltage or temperature. For localized changes in circuit topology, newly computed timing on new signal paths is "changed" by default because there is no earlier timing in the database for those paths.

The techniques described above can be combined with other software techniques that may increase the performance of a multiple processor system. For example, it may be important to avoid locking behavior between the code running on different processors 140. For example, if different processors 140 execute memory allocation routines that need locks, performance may be reduced. Therefore, as an example, non-locking memory allocators are used, using a local memory allocator per processors.

The approaches described above may be implemented in software, in hardware, or in a combination of hardware or software. The software can include code or other instructions for general purpose, special purpose, or virtual processors. The software can be stored on computer-readable media or sent on a signal over a network. Multiple servers can be integrated (e.g., in a single chip, board, backplane, or chassis) or can be distributed, for example, over a local or wide area data network. Hardware can include special purpose or configurable computing devices, for example, that are particularly tailored for the timing computations that are performed.

It is to be understood that the foregoing description is intended to illustrate and not to limit the scope of the invention, which is defined by the scope of the appended claims. Other embodiments are within the scope of the following claims.

What is claimed is:

1. A system for circuit timing analysis comprising:
   a plurality of interconnected servers, each server comprising an instance of
      a database for holding results of execution of portions of a timing analysis computation;
      a plurality of computation modules configured for concurrent execution of the portions of a timing analysis computation; and
      a control subsystem coupled to the database and to the computation modules;
   wherein the control subsystem is configured to iteratively
      receive results of the portions of the computation from one of the computation modules,
      update the database using the received results, and
      based on the updated database and received results, select further portions of the computations for computation and assign each selected portion to one of the computation modules.

2. The system of claim 1 wherein the system further comprises:
   a first queue coupled to the control subsystem for receiving the results from the computation modules and for providing the received results to the control subsystem.

3. The system of claim 1 wherein the control subsystem comprises:
   an aggregator configured to select the further portions of the computations;
   a second queue coupled to the aggregator for receiving entries identifying the selected portions; and
   a dispatcher for assigning each selected portion to one of the computation modules.

4. The system of claim 1 wherein the control subsystem on each of at least some of the servers is configured to send selected to the results received from computation modules on one of the servers to control modules at other of the servers.

5. The system of claim 1 wherein the control module on each of at least some of the servers is configured to:
   receive results of the portions of the computation from other of the servers; and
   based on the received results select further portions of the computations and assign each selected portion to one of the computation modules at that server.

6. The system of claim 5 wherein the control module on each of at least some of the servers is further configured to:
   update the database at that server using the received results from the other of the servers.

7. The system of claim 1 wherein each portion of the timing analysis computation is associated with a corresponding portion of an integrated circuit.

8. The system of claim 1 wherein each computation module is hosted on a different processing unit of a parallel processing system.

9. The system of claim 8 wherein each processing unit comprises a separate processing core.

10. A method for circuit timing analysis using a plurality of interconnected servers, each server running an instance of a database and instances of a plurality of computation modules, the method comprising:
    dispatching portions of a timing analysis computation to the plurality of computation modules, the computation modules being configured for concurrent execution of computations;
    maintaining the database, including maintaining storage for holding results execution of the portions of the computation on the computation modules;
    iteratively
       receiving results of the portions of the computation from one of the computation modules;
       updating the database using the received results;
       selecting further portions of the computations based on the updated database and the received results; and
       assigning each selected portion to one of the computation modules for dispatching to the computation module.

11. The method of claim 10 wherein receiving the results from the computation modules comprises:
   enqueuing the results in a queue; and
   dequeuing the results from the queue.

12. The method of claim 10 wherein maintaining the database includes providing the computation modules access to the database without requiring synchronization of the access.

13. The method of claim 12 wherein providing the computation modules access comprises providing access to results of portions of the computations performed by the computation modules.

14. The method of claim 10 further comprising:
   for each received result, determining if the result is needed for execution of a portion of the computation at a remote system, and if so, sending the result to the remote system.

15. The method of claim 10 further comprising:
   receiving results of portions of the computation executed at a remote system; and
   selecting further portions of the computations based on the results received from remote systems.

16. A computer-readable medium encoded with software comprising instructions for causing a computing system including a plurality of interconnected servers, each server comprising an instance of a database and instances of computation modules, to:
   dispatch portions of a timing analysis computation to a plurality of instances of computation modules, the instances of computation modules being configured for concurrent execution of computations;
   maintain the database, including maintaining storage for holding results execution of the portions of the computation on the instances of computation modules; and
   iteratively
      receive results of the portions of the computation from the instances of computation modules;
      update the database using the received results;
      select further portions of the computations based on the updated database and received results; and
   assign each selected portion to one of the computation modules for dispatching to the computation module.

17. A system for circuit timing analysis comprising:
a plurality of interconnected servers, each server comprising an instance of
   a database for holding results of execution of portions of a timing analysis computation;
   a plurality of computation modules configured for concurrent execution of the portions of a timing analysis computation; and
   means for controlling the computation modules and the database by iteratively receiving results of the portions of the computation from one of the computation modules, updating the database using the received results, and based on the updated database and received results selecting further portions of the computations for computation and assigning each selected portion to one of the computation modules.

* * * * *